United States Patent

Mariën et al.

Patent Number: 5,411,843
Date of Patent: May 2, 1995

[54] PHOTOGRAPHIC MATERIAL COMPRISING A COPOLYESTER SUPPORT

[75] Inventors: August Mariën, Westerlo; Marc Stevens, Belsele; Joannes Verheijen, Ranst, all of Belgium

[73] Assignee: AGFA-Gevaert, N.V., Mortsel, Belgium

[21] Appl. No.: 123,475

[22] Filed: Sep. 20, 1993

[30] Foreign Application Priority Data

May 24, 1993 [EP] European Pat. Off. ........... 93201476

[51] Int. Cl.$^6$ ................................................ G03C 3/02
[52] U.S. Cl. .................................... 430/501; 430/533; 430/535; 430/637; 528/293; 528/295; 528/301
[58] Field of Search ............... 430/501, 533, 535, 637; 528/293, 295, 301

[56] References Cited

U.S. PATENT DOCUMENTS

| | | | |
|---|---|---|---|
| 3,052,543 | 9/1962 | Bauer et al. | 430/535 |
| 3,684,768 | 8/1972 | King et al. | 528/302 |
| 4,241,170 | 12/1980 | Bayless | 430/533 |
| 4,598,141 | 7/1986 | Fock | 528/293 |
| 5,057,403 | 10/1991 | Kume et al. | 430/501 |

FOREIGN PATENT DOCUMENTS

| | | |
|---|---|---|
| 0334367 | 9/1989 | European Pat. Off. . |
| 0493008 | 7/1992 | European Pat. Off. . |
| 0496346 | 7/1992 | European Pat. Off. . |

*Primary Examiner*—Thomas R. Neville
*Attorney, Agent, or Firm*—Breiner & Breiner

[57] ABSTRACT

A photographic material comprising at least one silver halide emulsion layer and a copolyester support-said copolyester comprising polyether group(s) in the side chain is disclosed.

Preferably the copolyester is prepared by copolycondesing diol moieties that comprise a polyether group substituted with a sulfonic acid group in acid or salt form into the copolyester.

11 Claims, No Drawings

PHOTOGRAPHIC MATERIAL COMPRISING A COPOLYESTER SUPPORT

DESCRIPTION

1. Field of the Invention

This invention relates to a polyester base for photographic films and to photographic films in which the polyester base combines the curl extinguishing properties of cellulose triacetate film with favourable mechanical properties.

2. Background of the Invention

In photographic materials a photosensitive composition, e.g. a silver halide emulsion, is adhered to a support. Depending on the use of the photographic material the support may be opaque (e.g. paper) or transparent (e.g. glass or a polymeric transparent film).

When a transparent support is used it is preferred to use a polymeric film, the most widely used polymeric film substrates for photographic materials being cellulose triacetate (CTA) and polyethylene terephthalate (PET). The main advantages of cellulose triacetate are the optical isotropy, high transparency and the ability to eliminate curl during processing. Due to this last property CTA is mainly used in the production of roll-film. When a photographic film is rolled around a core in a film cartridge and remains rolled for a fairly long time, the film tends to get curl. This curl has to be diminished and even eliminated for flawless operation of the roll-film material in the printing step subsequent to the development. When after processing the curl is not eliminated, the film can jam during the printing step, can be scratched etc. Also for easy storage the negatives of a roll-film should be as flat as possible. In CTA the residual curl is easily eliminated during processing, and automatic printing of the films can proceed flawlessly.

The dimensional stability and the mechanical strength of cellulose triacetate film however are fairly low, therefore the use of polyethylene terephthalate (PET) film as a support for photographic materials is widely spread. In recording materials for diagnostic imaging e.g., where the films are automatically transported in daylight systems, film-changers, processors etc, the support of the films is almost exclusively a polyethylene terephthalate (PET) film. Also in the graphic arts where dimensional stability of the films is of utmost importance PET-film is used as the support for the light sensitive material.

For roll-film however, the use of PET-film poses the problem of curl-extinguishing. Contrary to the curl (due to core-setting) of cellulose triacetate film, the curl of a PET-film is not eliminated during the processing.

For use as a support in roll-film, it is highly desirable to have a support that combines the benefits of CTA-film with the strenghts of PET-film and dispenses from the weaknesses of both.

There are several proposals to modify the PET-film in such a way that it shows some of the strenghts of CTA without showing too much of the weaknesses of CTA.

In U.S. Pat. No. 3,052,543 a photographic PET support is disclosed where the PET molecules comprise aromatic sulfonic acids or their salts. The main advantage of doing so resides in a better anchorage between the support and the layers coated thereon.

In U.S. Pat. No. 4,241,170 a copolyester from aromatic dicarboxylic acid sulfonates and high molecular weight polyethylene glycol together with terephthalic acid, sulfoisophthalic acid and ethylene glycol is disclosed. The incorporation of the polyethylene glycol in the polyester chain is advantagageous for the vapour permeability of the polyester.

In EP-A 334.367 a polyester is disclosed with low haze, high mechanical strength and a water content >0.5% is disclosed. These effects are due to the incorporation of an aromatic dicarboxylic acid carrying a sulfonic acid group or its salt and of a aliphatic dicarboxylic acid or its ester in the polyester chain. However, the rate of water absorption of a copolyester according to the teachings of EP-A 334 367 is lower than that of CTA-film and the curl extinguishing properties still leave room for improvement. Also the rate of crystallization of such a copolyester is rather low, which has a negative influence on the physical properties and the thermostability of the support.

In EP-A 493.008 the incorporation of a polyether-dicarboxylic acid in the main PET chain, containing sulfoisophthalic acid moieties, is disclosed in order to have a support that combines the qualities of CTA and PET. The long polyether chain in the main PET-chain influences negatively the mechanical strength of the resulting polyester support.

In EP-A 496,346 the use of copolyesters of terephthalic acid, sulfoisophtalic acid and ethylene glycol with or without adipic acid is described to arrive at a film support that combines the qualities of cellulose triacetate film with those of PET-film. Although this support can be succesfully used, the crystalization properties of it still leave room for improvement.

In U.S. Pat. No. 3,684,768 a copolyester is disclosed that comprises diol moieties with a polyether group such as to provide a copolyester with polyether groups as side chains of the copolyester main chain. With such a copolyester it is possible to produce readily dyeable polyester fibers.

In EP 158.052 a polyester, useful in the production of readily dyeable polyester fibers is disclosed. This polyester incorporates a diol with a polyether unit side chain and a sulfonic acid group.

OBJECT AND SUMMARY OF THE INVENTION

It is an object of the invention to provide a photographic material comprising a silver halide emulsion layer coated on a support for photographic film that combines the qualities of a cellulose triacetate support with those of a polyethylene terephthalate support.

It is another object of the invention to provide a photographic material comprising a silver halide emulsion layer coated on a support, said support combining high mechanical strength, good transparency, fast curl extinguishing properties after processing.

It is a further object of the invention to provide a photographic material comprising a silver halide emulsion layer coated on a support, which, compared to polyethylene terephthalate, shows increased hydrofilicity while keeping the same rigidity in the polyester backbone.

Other objects and advantages of the present invention will become clear from the further description.

The above objects are realised by providing a photographic material comprising at least one silver halide emulsion layer and a copolyester support said copolyester comprising (a) polyether group(s) in the side chain.

Whilst in the preferred embodiment said polyether group in the side chain is introduced in the copolyester by incorporating diol moieties comprising a polyether group in the side chain in the copolyester, it is also possible to introduce such polyether group(s) in the side chain by adding in the copolyester preparation, a dicarboxylic acid or a hydroxycarboxylic acid with a polyether substituent in the side chain, in acid or ester form, to the reaction mixture.

In a further embodiment the polyether group(s) in the side chain may carry a sulfonic acid group in acid or salt form.

DETAILED DESCRIPTION OF THE INVENTION

The copolyester, used according to this invention comprises as predominant dicarboxylic acid moieties preferably aromatic dicarboxylic acid moieties and as predominant diol moieties alkylene diol moieties. Examples of aromatic dicarboxylic acid moieties are moieties of terephthalic acid, isophthalic acid, naphthalene dicarboxylic acids, 4,4' diphenylene dicarboxylic acid, 4,4'diphenylether dicarboxylic acid, 4,4'diphenylmethane dicarboxylic acid, 4,4'diphenylsulfodicarboxylic acid. Examples of alkylene diol moieties are moieties of ethylene glycol, diethylene glycol, 1,3-propanediol, 1,4-butanediol, 2-methyl-1,5-pentanediol, neopentylglycol, 1,4-cyclohexanedimethanol, p-xylene glycol.

In a preferred embodiment of the invention terephthalic acid moieties are the predominant dicarboxylic acid moieties in the copolyester and are present for at least 80 mole % with respect to the total acid moiety content of the polyester.

Together with terephthalic acid moieties it is preferred to have ethylene glycol moieties as predominant diol moieties in the copolyster of this invention. The ethylene glycol moieties are preferably present for at least 80 mole % with respect to the total diol moiety content of the polyester.

(A) polyether group(s) can be introduced in the side chain of the copolyester by adding molecules corresponding to following general formula (I) to the reaction mixture during polycondensation.

$$X^1-R^1-X^2 \quad (I)$$
$$\begin{array}{c} | \\ Y_p \\ | \\ (R^2O)_n-(R^3O)_m-R^4 \end{array}$$

Wherein:
$R^1$ represents an alkylene, arylene, aralkylene or cycloalkylene group
$X^1$ and $X^2$ each independently represent OH or COOR, with R=H or a lower alkyl group
Y represents a linking group selected from the group consisting of O, NH, COO or SO$_2$
$R^2$ and $R^3$ each independently represent an alkylene group with 1 to 4 C-atoms
$R^4$ represents a lower alkyl group or aryl which may be substituted with an hydrophilic group selected from the group consisting of sulphonic, sulphinic, phosphonic and carboxylic acids in salt form.

n is an integer between 0 and 200
m is an integer between 0 and 100
n+m>1
p equals 0 or 1

For introducing the polyether group(s) in the side chain of the copolyester via dicarboxylic acids or esters according to the general formula (I), it is preferred to use following components:

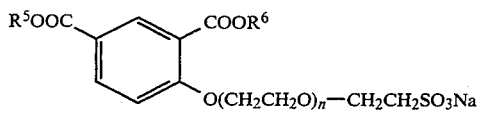

wherein
$R^5$, $R^6$=H or lower alkyl and $5 \leq n \leq 100$, or

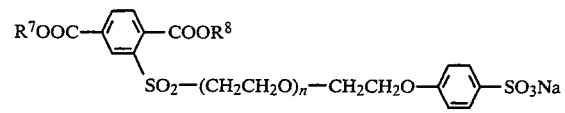

wherein
$R^7$, $R^8$=H or lower alkyl and $5 \leq n \leq 100$

The aromatic dicarboxylic acid moieties or the lower alkyl esters thereof that carry a polyether chain, are preferably present in the copolyester in amounts between 1 and 20% w/w to the total weight of the polyester, preferably between 2 and 15% w/w.

For introducing the polyether group(s) in the side chain of the copolyester via a monohydroxycarboxylic acid or ester according to general formula (I), it is preferred to use following compounds:

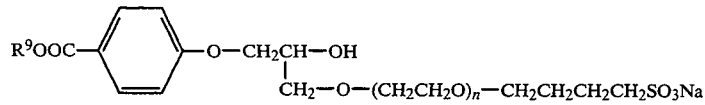

wherein
$R^9$ is hydrogen or lower alkyl and $5 \leq n \leq 100$

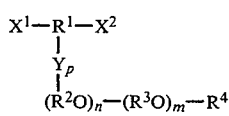 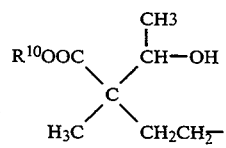

wherein
$R^{10}$ is hydrogen or lower alkyl and $5 \leq n \leq 100$

For introducing the polyether group(s) in the side chain of the copolyester via a diol according to the general formula (I), it is most preferred to use 1,2 diols, 1,3 diols or 1,4 diols carrying (a) polyether group(s) in the side chain. The synthesis of such diols has been described in U.S. Pat. No. 4,618,457.

In a preferred embodiment moieties of a diol corresponding to following formula are incorporated in the copolyesters of this invention to introduce (a) polyethergroup(s) in the side chain:

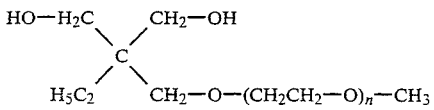

wherein 5≦n≦100

In the most preferred embodiment of the present invention diols corresponding to following formula are used to introduce (a) polyethergroup(s) in the side chain of the copolyester:

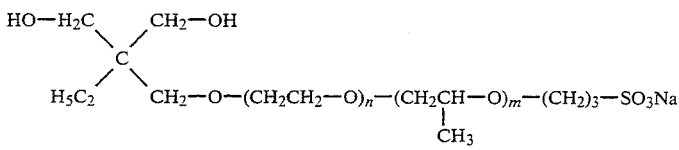

wherein $5 \leq n+m$, $0 \leq n \leq 100$ and $0 \leq m \leq 50$.

The diol moieties with (a) polyether group(s) in the side chain are advantageously present in the copolyester in amounts ranging from 1 to 20% w/w with respect to the total weight of the polyester. Preferably the diol moieties with (a) polyether group(s) in the side chain are present in amounts ranging from 2 to 15% w/w with respect to the total weight of the polyester.

It is possible to incorporate further polyethylene glycol moieties into the colyester. When incorporating polyethylene glycol (PEG) moieties, it is preferred to have at most 20% w/w, e.g. 0.1 to 20% w/w, with respect to the total weight of the polyester. Preferably PEG with molecular weight between 300 and 10,000 are used; most preferably the PEG, used in accordance to this invention, has a molecular weight between 1000 and 3000.

Together with terephthalic acid, present as predominant dicarboxylic acid in the copolyester, sulfonated aromatic dicarboxylic acid are advantageously used in the preparation of the copolyester of this invention. Sulfoisophthalic acid is the most preferred sulfonated aromatic-carboxylic acid to be incorporated in the copolyester, preferably the amount of sulfoisophthalic acid is 1 to 10 mol % versus the total acid component.

It is also possible to incorporate aliphatic dicarboxylic acids, e.g. adipic acid, succinic acid, sebacic acid, etc. together with the terephthalic acid and the sulfoisophthalic acid. Adipic acid is added in amounts ranging from 0 to 10 mol % of the total acid content of the copolyester.

It is possible, as teached in EP-A 493.008, to incorporate into the copolyester, according to the present invention, chain terminating monohydroxypolyalkylene oxide, in order to accelerate the water absorption of the copolyester. However, since a high molecular weight (co)polyester is required to produce a support with sufficient mechanical strength, the amount of chain-terminating monohydroxypolyalkylene oxide that can be incorporated in the copolyester has to be limited. Preferably not more than 0.25 mole % with respect to the total diol content is added to the reaction mixture. The molecular weight of the monohydroxypolyalkylene oxide, that is useful to be incorporated in the copolyester according to this invention, is between 1000 and 3000.

In the preparation of the copolyester according to the present invention, it is preferred to use mono-hydroxypolyalkylene oxide compounds corresponding to the general formula:

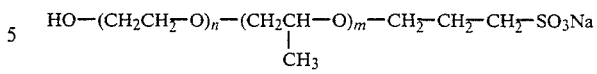

wherein
$5 \leq n+m$ and $0 \leq n \leq 100$ and $0 \leq m \leq 50$

The copolyester can be synthesized from the mixture dicarboxylic acids or its alkylesters and diols in the desired proportions by the common two-step preparation technique for polyester viz. by transesterification and polycondensation. Suitable catalysts for the transesterification include salts of zinc, manganese, magnesium, calcium and sodium. A preferred catalyst is zinc acetate. Suitable catalysts for the polycondensation include antimony trioxide and germanium dioxide. Titanium salts, e.g. tetraisopropyltitanate, can act as catalysts for both the transesterification and the polycondensation.

Furtheron during the polycondensation a so-called thermal stabilizer is preferably present, e;g. phosphate- and phosphite esters like trimethyl-, triethyl-, triphenyl phosphate or -phosphite.

The transesterification proceeds advantageously between 160° and 250 ° C. and the polycondensation proceeds advantageously in the melt, preferably in the range of 250° to 280° C. In the preparation of the polyester, according to the present invention, zinc acetate dihydrate and antimony(III) oxide, as described for example in U.S. Pat. No. 3,054,703, are the preferred catalysts. The amount of diethylene glycol (DEG), formed during the polycondensation reaction (especially when sulfoisophthalic acid is present in the reaction mixture), influences negatively the mechanical and thermal properties of the (co)polyester. By chosing of the proper combination of catalysts e.g. sodium acetate or calcium acetate, the amount of DEG can be controlled. It is also possible to limit the amount of DEG in the copolyester according to the present invention, by entering the sulfoisophthalic acid moieties after the transesterification as its bis-β-hydroxyethylester. In the copolyester, according to this invention it is preferred that the amount of DEG is less than 5% w/w with respect to the total weight of the polyester.

The thus obtained copolyester is generally granulated, dried, melt extruded to form an unstretched film sheet, then biaxially stretched and heat treated to obtain the copolyester film support.

Usually the biaxially orientation of the polyester film support is performed in two stages. First the film is stretched in the longitudinal direction and afterwards in the direction perpendicular to the first. After the biaxial stretching the film is conducted through a heat-setting zone wherein the polyester film is heated until a temperature between 150° and 220° C. is reached, while the film is kept under tension in both directions.

To further enhance the termostability of the (co)polyester it is possible to proceed, after the heat-setting operation, to a thermal relaxation. In this relaxation step the (co)polyester film is allowed to shrink in a controlled way while the film is kept at a temperature below the heat-setting temperature and above the Tg of the (co)polyester.

If the intented use of the copolyester film according to this invention, dictates the necessity to add colourants, lubricants, inorganic particles, antistatic agents, etc., these additions can be made without deteriorating the properties of the copolyester.

The copolyester, according to this invention, can be used in the production of opaque, voided copolyester films as described in e.g. U.S. Pat. No. 4,187,113 ; GB 1,563,591, EP-A 360201.

The copolyester film according to this invention, may be pretreated (e.g. by corona or flame treatment) to ensure good adhesion of any hydrophilic layer to the copolyester support. The copolyester film support of this invention may be coated with subbing layers to ensure the bonding between the copolyester and any kind of hydrophilic layer coated on the copolyester support. These subbing layers may be applied before or after the biaxial stretching of the copolyester film, but advantageously between the longitudinal and transversal stretching. The copolyester support according to this invention may be subbed on both sides of the support. Suitable subbing layers are described e.g. in EP 0 078 559, U.S. Pat. No. 3,751,280, European Non published application 92200593.9 etc. The subbing layer may also comprise antistatic products as described e.g. in European non published application 92203978.9, U.S. Pat. No. 5,006,451, EP-A 429179.

A photographic silver halide emulsion material comprising a support according to the present invention as defined hereinbefore may contain on one or both sides of the support (a) silver halide emulsion layer(s) of any type known to those skilled in the art. For example, these materials may contain a silver halide emulsion layer of the type used in continuous tone or halftone photography, microphotography, radiography and films for graphic arts application. The defined support can be used most advantageously in black-and-white or colour photographic materials that are presented as roll-film. The defined support can have any thickness which is customary in materials for silver-halide photography, i.e. between 50 and 400 μm. Preferably said support has a thickness between 50 and 150 μm.

For the composition of silver halide emulsion layers reference is made e.g. to Research Disclosure 17,643 of December 1978 and Research Disclosure 307,105 of November 1989.

A photographic silver halide emulsion material comprising a support according to the present invention as defined hereinbefore may comprise, apart from (a) silver halide emulsion layer(s), antistatic layers as described in e.g. EP-A 440957, European non published application 92203149.7, European non published application 92200230.8, U.S. Pat. No. 4,495,276, and EP-A 191302; also (a) magnetic recording layer(s) as described in EP-A 496346, antihalation layers, backing layers, intermediate layers and protective layers may be present.

In the examples herinafter, the following characteristics of the copolyester, according to this invention, were measured as indicated.

MEASUREMENT METHODS

1. Thermal Properties

Glass transition temperature (Tg in °C.), the crystalline melting point (Tm in °C.), the crystallisation temperature by heating (Tx in °C.) and the crystallisation enthalpy (Q in J/g) are determined by differential scanning calorimetry. The apparatus used is a METTLER DSC305 sold by Mettler AG Switzerland. The thermal analysis of the polyester proceeds as follows: a sample of amorphous polyester is heated from 0° C. on at a rate of 10° C./min. The first inflection point in the temperature curve gives the glass transition temperature (Tg). The heating of the sample is carried on and the exothermic peak in the heating curve is the crystallization temperature by heating (Tx) and the area under the exothermic peak gives the crystallisation enthalpy (Q in J/g). By further heating an endothermic peak is observed in the heating curve and the temperature corresponding to this endothermic peak is the melt temperature (Tm).

2. Curl Extinguishing Properties

A sample film of 35 mm×900 mm insize was lenghtwise wound around a core with a diameter of 11 mm. The sample was conditioned for 24 hours at 50° C. After cooling the teststrip was cut into 150 mm portions and processed by immersing the strips for 2.5, 5, 10 and 15 minutes in distilled water of 38° C. Then the strips are dryed hanging under a weight of 50 g either for 3 minutes at 50° C. (hereinafter termed curl 2.5/3/50, 5/3/50, 10/3/50 and 15/3/50 respectively) or for 15 minutes at a temperature of 21° C. (hereinafter termed curl 2.5/15/21, 5/15/21, 10/15/21 and 15/15/21 respectively). After drying the strips were put flat on a table and the diameter of the curl was measured. This diameter was transposed to a quality figure (table 1), 5 corresponding to the highest quality and 1 to the lowest quality.

TABLE 1

| Quality figure | Curl diameter |
|---|---|
| 5 | >200 mm |
| 4 | >60 mm and <200 mm |
| 3 | >40 mm and <60 mm |
| 2 | >20 mm and <40 mm |
| 1 | <20 mm |

3. E- Modulus

The E-modulus (elasticity modulus) is determined on a 10 cm long and 1 cm wide strip of film by stretching this strip at a rate of 10 mm/min in a tensile tester (INSTRON1122, Instron Ltd UK).

4. Haze

Haze was determined according to ASTM 1003.

In the examples, following hereafter, the reactants for the preparation of the polyester are designated by following abbreviations:

PTA: purified terephthalic acid or its dimethyl ester
SIP: 5-sulphoisophthalic acid dimethyl ester or its sodium salt
EG: 1,2 ethanediol
PEG: polyethylene glycol molecular weight 3000
AA: adipic acid or its dimethyl ester
DS3117: TEGOMER DS3117 A trade name of Th. GOLDSCHMIDT AG of Essen Germany for $$\text{HO-H}_2\text{C} \diagdown \text{C} \diagup \text{CH}_2\text{-OH}$$
$$\text{H}_5\text{C}_2 \diagup \text{C} \diagdown \text{CH}_2\text{-O-(CH}_2\text{CH}_2\text{O)}_n\text{-(CH}_2\text{CH-O)}_m\text{-(CH}_2)_3\text{-SO}_3\text{Na}$$
$$\underset{\text{CH}_3}{|}$$

Wherein
n+m=21 and n=14 and m=7)

D3403: TEGOMER D3403 A trade name of Th. GOLDSCHMIDT AG of Essen Germany for $$\text{HO-H}_2\text{C} \diagdown \text{C} \diagup \text{CH}_2\text{-OH}$$
$$\text{H}_5\text{C}_2 \diagup \text{C} \diagdown \text{CH}_2\text{-O-(CH}_2\text{CH}_2\text{O)}_n\text{-CH}_3$$

Wherein n=23)

EXAMPLE 1

The preparation of the copolyesters suitable for use according to this invention is illustrated by the following preparation:

A reaction mixture of
737.75 g of dimethyl terephthalate (3.8 moles)
59.20 g of 5-sulphoisophthalic acid dimethyl ester sodium salt (0.2 mole)
496 g of ethylene glycol (8.0 moles)
175 mg of zinc acetate dihydrate and 116.8 mg of antimony(III)oxide was heated to 160° C. whilst stirring in a nitrogen atmosphere.

At that temperature transesterification took place and methanol was distilled. Gradually the temperature was raised to 250° C. over a period of 3 to 4 h, until no methanol distilled anymore. Then 85.7 g (10% w/w to total-weight of the polyester) or 0.064 mole of TEGO DS3117 was added together with 260.8 mg triphenylphosphate. Thereupon the temperature was further raised to 255° C. and the reaction mixture subjected to a reduced pressure of 10–20 Pa. Under these conditions the polycondensation took place. The viscosity of the reaction mixture is continuously monitored by measuring the electric current necessary to operate the stirrer. When the desired chain lenght (viscosity) is obtained, the polyester is cooled. There is obtained a clear, colourless polyester With intrinsic viscosity $\eta$ of from 0.45 to 0.55 dl/g measured at a temperature of 25° C. in a mixture of phenol and o-dichlorobenzene (60/40 by weight).

After milling and drying at 160° C. onder reduced pressure the polyester is extruded at 265° C. to form a film. After extrusion the film is stretched at a temperature above Tg in longitudinal and at a temperature of 70° C. in transversal direction. The stretching ratio was 3.3 in both the longitudinal and transversal direction. The stretched film is thermoset at 170° C. during 30 seconds. The biaxially stretched film has a thickness of 75 μm.

COMPARATIVE EXAMPLES 1 AND 2

Polyesters according to comparative examples 1 and 2 are prepared in the same way as the polyester described in example 1, except for differences in the acids and diols that are used.

In table 2 the acids and diols used to prepare the copolyester, according to example 1 and to comparative example 1 and 2 are summarized. In table 3 the properties of the copolyesters according to example 1 are compared to the properties of the polyester according to comparative examples 1 and 2 and to the properties of polyethylene terephthalate film (PET) and triacetate film (CTA)

TABLE 2

|  | Example 1 | Comparative Examples 1 | Comparative Examples 2 |
|---|---|---|---|
| PTA in mole % | 95 | 95 | 85 |
| SIP in mole % | 5 | 5 | 5 |
| AA in mole % | 0 | 0 | 10 |
| EG in mole % | 98.4 | 99.3 | 100 |
| PEG in % w/w | 0 | 10 | 0 |
| DS3117 in % w/w | 10 | 0 | 0 |

TABLE 3

|  | Example 1 | Comparative Ex. 1 | Comparative Ex. 2 | PET | CTA |
|---|---|---|---|---|---|
| DEG % w/w formed | 4.05 | 4.70 | 6.50 | 1.30 | n.a. |
| Intrin. visco $\eta$ | 0.46 | 0.49 | 0.54 | 0.55 | n.a. |
| Tg °C. | 64 | 56 | 57 | 79 | 134 |
| Tm °C. | 225 | 225 | & | 255 | 297 |
| Tx °C. | 157 | 151 | & | 146 | n.a. |
| Q (J/g) | 27 | 29 | & | 44 | 20 |
| Curl 2.5/3/50 * | 5 | 2 | 5 | 1 | 2 |
| Curl 5/3/50 * | 5 | 5 | 5 | 2 | 4 |
| Curl 10/3/50 * | 5 | 5 | 5 | 2 | 4 |
| Curl 15/3/50 * | 5 | 5 | 5 | 2 | 5 |
| Curl 2.5/15/21 ** | 2 | 2 | 2 | 1 | 2 |
| Curl 5/15/21 ** | 5 | 2 | 2 | 1 | 3 |
| Curl 10/15/21 ** | 5 | 3 | 3 | 1 | 4 |
| Curl 15/15/21 ** | 5 | 4 | 3 | 2 | 4 |
| Haze BP % + | 1 | 1 | 4.9 | 1 | 1 |
| Haze AP % ++ | 2 | 4 | 5.6 | 1 | 1 |
| E-modulus N/mm $\times 10^3$ | 3.35 | 2.90 | 3.2 | 4.2 | 3.2 |

& : does not crystalize
* : after 2.5, 5, 10 and 15 minutes processing respectively followed by 3 minutes drying at 50° C.
** : after 2.5, 5, 10 and 15 minutes processing respectively followed by 15 minutes drying at 21° C.
+ : Before processing (BP)
++ : After processing (AP)
n.a. : not available or not applicable The copolyester according to the present invention clearly presents, compared to the prior art (co)polyesters, a more advantageous combination of curl extinguishing properties, haze and physical properties.

EXAMPLE 2

The procedure of example 1 was repeated, except for the combination of catalysts. Together with 175 mg of zinc acetate dihydrate and 116.8 mg of antimony(III)oxide, 328 mg of sodium acetate was added to the reaction mixture.

EXAMPLE 3

The procedure of example 1 was repeated, except that no 5-sulphoisophthalic acid dimethyl ester sodium salt was added to the reaction mixture and 12.5% w/w of DS3117 was added to the reaction mixture.

EXAMPLE 4

The procedure of example 1 was repeated except for the presence of a lower amount of 5-sulphoisophthalic acid dimethyl ester sodium salt moieties that are incorporated in the copolyester.

EXAMPLES 5 AND 6

The procedure of example 1 was repeated except for the presence of lower amounts of DS3117.

EXAMPLE 7

The procedure of example 1 was repeated except for the presence of D3403 as diol carrying a polyether group instead of DS3117.

EXAMPLE 8

The procedure of example 5 was repeated, except for the presence of a monohydroxypolyethylene compound with molecular weight of 2000 as chain terminator.

In table 4 the acids and diols used to prepare the copolyester, according to examples 2 to 8 are summarized. The physical and curl extinguishing properties of the copolyesters according to example 2 to 8 are to be found in table 5.

TABLE 4

| | Example | | | | | | |
|---|---|---|---|---|---|---|---|
| | 2 | 3 | 4 | 5 | 6 | 7 | 8 |
| PTA in mole % | 95 | 100 | 96.5 | 95 | 95 | 95 | 95 |
| SIP in mole % | 5 | 0 | 3.5 | 5 | 5 | 5 | 5 |
| EG in mole % | 98.4 | 98.0 | 98.4 | 99.1 | 98.75 | 98.2 | 99.1 |
| DS3117 in % w/w | 10 | 12.5 | 10 | 6 | 8 | 0 | 6 |
| D3404 in % w/w | 0 | 0 | 0 | 0 | 0 | 10 | 0 |
| HO—(C$_2$H$_4$O)$_n$-CH$_3$ * | 0 | 0 | 0 | 0 | 0 | 0 | 2.5 |

* : monohydroxypolyethyleneoxide with molecular weight 2000. in % w/w

TABLE 5

| | Example | | | | | | |
|---|---|---|---|---|---|---|---|
| | 2 | 3 | 4 | 5 | 6 | 7 | 8 |
| DEG % w/w formed | 1.37 | 1.40 | 4.40 | 5.30 | 4.30 | 6.10 | 4.60 |
| Intrin. visco $\eta$ | 0.47 | 0.63 | 0.47 | 0.44 | 0.45 | 0.495 | 0.458 |
| Tg °C. | 69 | 56 | 62 | 68 | 67 | 56 | 65 |
| Tm °C. | 242 | 252 | 234 | 224 | 231 | 213 | 230 |
| Tx °C. | 154 | 133 | 144 | 177 | 163 | 156 | 158 |
| Q (J/g) | 32 | 28 | 33 | 24 | 31 | 23 | 29 |
| Curl 3/50 * | 5 | 5 | 5 | 5 | 5 | 5 | 5 |
| Curl 15/21 ** | 5 | 2 | 5 | 2 | 4 | 3 | 3 |

* : after 15 min processing followed by 3 minutes drying at 50° C.
** : after 15 min processing followed by 15 minutes drying at 21° C.

EXAMPLE 9 TO 11

The procedure of example 1 was repeated except for the presence of polyethylene glycol (PEG) together with DS3117. The proportions of PEG and DS3117 are summarized in table 6.

EXAMPLE 12 AND 13

For example 12 the procedure of example 6 is repeated except for the presence of adipic acid. For example 13 the procedure of example 5 is repeated except for the presence of adipic acid. The composition of the polyesters according to example 12 and 13 are summarized in table 6.

The physical and curl extinguishing properties of the copolyesters according to example 9 to 13 are to be found in table 7.

TABLE 6

| | Example | | | | |
|---|---|---|---|---|---|
| | 9 | 10 | 11 | 12 | 13 |
| PTA in mole % | 95 | 95 | 95 | 90 | 87.5 |
| SIP in mole % | 5 | 5 | 5 | 5 | 5 |
| AA in mole % | 0 | 0 | 0 | 5 | 7.5 |
| EG in mole % | 99.1 | 98.85 | 98.5 | 98.75 | 99.1 |
| DS3117 in % w/w | 3.5 | 6 | 8 | 8 | 6 |
| PEG in % w/w | 6 | 3.5 | 3.5 | 0 | 0 |

TABLE 7

| | Example | | | | |
|---|---|---|---|---|---|
| | 9 | 10 | 11 | 12 | 13 |
| DEG % w/w formed | 4.50 | 3.93 | 3.43 | 4.54 | 5.17 |
| Intrin. visco $\eta$ | 0.502 | 0.485 | 0.486 | 0.481 | 0.488 |
| Tg °C. | 60 | 64 | 60 | 59 | 56.4 |
| Tm °C. | 230 | 232 | 234 | 223 | 213 |
| Tx °C. | 155 | 152 | 146 | 160 | 169 |
| Q (J/g) | 30 | 30 | 30 | 24 | 8 |
| Curl 3/50 * | 5 | 5 | 5 | 5 | 5 |
| Curl 15/21 ** | 5 | 5 | 5 | 5 | 5 |

* : after 15 min processing followed by 5 minutes drying at 50° C.
** : after 15 min processing followed by 15 minutes drying at 21° C.

We claim:

1. A photographic material comprising a copolyester support wherein said copolyester is prepared by a condensation reaction of at least one dicarboxylic acid in acid or ester form and at least one diol and wherein at least one compound (C) is copolycondensed corresponding to the general formula (I):

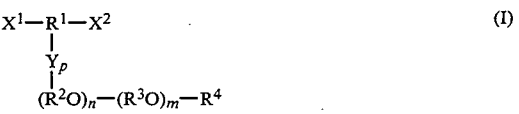

wherein:
- $R^1$ represents an alkylene, arylene, aralkylene or cycloalkylene group
- $X^1$ and $X^2$ each independently represent OH or COOR, with R=H or a lower alkyl group
- Y represents a linking group selected from the group consisting of O, NH, COO and SO$_2$
- $R^2$ and $R^3$ each independently represent an alkylene group with 1 to 4 C-atoms
- $R^4$ represents a lower alkyl group or aryl which may be substituted with an hydrophilic group selected from the group consisting of sulphonic, sulphinic, phosphonic and carboxylic acids in salt form,
- n is an integer between 0 and 200,
- m is an integer between 0 and 100, and
- n+m >1
- p equals 0 or 1.

2. A photographic material comprising a copolyester support according to claim 1 wherein $R^4$ is substituted with a sulfonic acid group in acid or salt form.

3. A photographic material comprising a copolyester support according to claim 1, wherein said compound (C) that is copolycondensed is a diol corresponding to the formula:

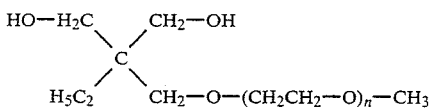

wherein $5 \leq n \leq 100$.

4. A photographic material comprising a copolyester support according to claim 1, wherein said compound (C) that is copolycondensed is a diol corresponding to the formula:

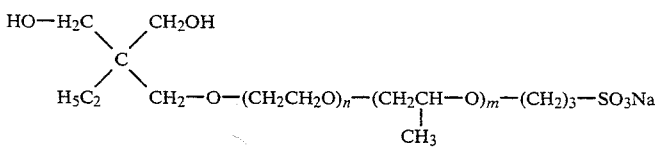

wherein $5 \leq n+m$, $0 \leq n \leq 100$ and $0 \leq m \leq 50$.

5. A photographic material comprising a copolyester support according to claim 1, herein said compound (C) is present between 1 and 20% w/w with respect to the total polyester.

6. A photographic material comprising a copolyester support according to claim 1, wherein said copolyester comprises copolyester chains terminated by a monohydroxy compound corresponding to the general formula:

$$HO-(CH_2CH_2-O)_n-(CH_2CH-O)_m-CH_2-CH_2-CH_2-SO_3Na$$
$$\qquad\qquad\qquad\qquad\qquad\quad |$$
$$\qquad\qquad\qquad\qquad\qquad\; CH_3$$

wherein
$5 \leq n+m$ and $0 \leq n \leq 100$ and $0 \leq m \leq 50$.

7. A photographic material comprising a copolyester support according to claim 1, wherein said copolyester further comprises between 1 and 10 mol % with respect to the total acid moieties of the polyester of a sulfonated aromatic or sulfonated aliphatic dicarboxylic acid.

8. A photographic material comprising a copolyester support according to claim 7, wherein said sulfonated aromatic dicarboxylic acid moieties are moieties of the sodium salt of sulfoisophthalic acid.

9. A photographic material comprising a copolyester support according to claim 1, wherein said copolyester comprises further between 0 and 10 mol % with respect to the total acid moieties of the polyester of an aliphatic dicarboxylic acid.

10. A photographic material comprising a copolyester support according to claim 1, wherein said copolyester comprises further at most 20% w/w with respect to the total polyester of moieties derived from polyethylene glycol.

11. A photographic material comprising a copolyester support according to claim 1, wherein said photographic material is a roll film photographic material.

* * * * *